(12) United States Patent
Zhu et al.

(10) Patent No.: US 12,530,070 B2
(45) Date of Patent: Jan. 20, 2026

(54) DYNAMIC MANAGEMENT METHOD AND DYNAMIC MANAGEMENT SYSTEM FOR ACTIVE STATE POWER MANAGEMENT MECHANISM

(71) Applicant: REALTEK SEMICONDUCTOR CORP., Hsinchu (TW)

(72) Inventors: Qin Zhu, Jiangsu Province (CN); Jun-Jiang Huang, Jiangsu Province (CN); Chang-Chun Li, Hsinchu (TW); Chun-Hao Lin, Hsinchu (TW); Sung-Kao Liu, Hsinchu (TW); Xing Wang, Jiangsu Province (CN); Chin-Wei Hsu, Hsinchu (TW); Chun-Wei Gu, Jiangsu Province (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1 day.

(21) Appl. No.: 18/391,829

(22) Filed: Dec. 21, 2023

(65) Prior Publication Data
US 2024/0211012 A1 Jun. 27, 2024

(30) Foreign Application Priority Data
Dec. 23, 2022 (CN) .......................... 202211664235.1

(51) Int. Cl.
*G06F 1/3287* (2019.01)
*G06F 1/3203* (2019.01)
*G06F 1/3215* (2019.01)
*G06F 1/3234* (2019.01)
*G06F 13/40* (2006.01)
*G06F 13/42* (2006.01)

(52) U.S. Cl.
CPC .......... *G06F 1/3215* (2013.01); *G06F 1/3287* (2013.01)

(58) Field of Classification Search
CPC ..... G06F 1/3215; G06F 1/3287; G06F 1/3203
See application file for complete search history.

(56) References Cited

U.S. PATENT DOCUMENTS

2006/0265612 A1 11/2006 Tseng et al.
2020/0285534 A1* 9/2020 Chaiken .............. G06F 11/0745
(Continued)

*Primary Examiner* — Jaweed A Abbaszadeh
*Assistant Examiner* — Gayathri Sampath
(74) *Attorney, Agent, or Firm* — Li & Cai Intellectual Property (USA) Office (57) ABSTRACT

Dynamic management method and system for an active state power management (ASPM) mechanism are provided. The method is applicable to a peripheral component interconnect express (PCIe) transmission architecture that includes a host and a PCIe downstream component. The method includes: configuring the PCIe downstream component to perform: determining whether data transmission status between a PCIe upstream component and the PCIe downstream component is in a busy state, a stable idle state or a temporary state; in response to determining that the data transmission status is in the busy state, forcibly disabling the ASPM function; in response to determining that the data transmission state is in the stable idle state, forcibly enabling the ASPM function; and in response to determining that the data transmission state is in the temporary state, determining whether the data transmission state is the busy state, the stable idle state or the temporary state again.

12 Claims, 4 Drawing Sheets

(56) References Cited

U.S. PATENT DOCUMENTS

2020/0310517 A1* 10/2020 Li .................... G06F 1/3253
2020/0327032 A1* 10/2020 Wu ................... G06F 11/3442
2022/0382696 A1    12/2022 Jeon et al.
2024/0385672 A1* 11/2024 Lin .................... G06F 1/325

* cited by examiner

DYNAMIC MANAGEMENT METHOD AND DYNAMIC MANAGEMENT SYSTEM FOR ACTIVE STATE POWER MANAGEMENT MECHANISM

CROSS-REFERENCE TO RELATED PATENT APPLICATION

This application claims the benefit of priority to China Patent Application No. 202211664235.1, filed on Dec. 23, 2022 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a management method and a management system, and more particularly to a dynamic management method and a dynamic management system for an active state power management (ASPM) mechanism.

BACKGROUND OF THE DISCLOSURE

The peripheral component interconnect express (PCIe) standard specifies an ASPM mechanism. PCIe can operate in four power states, including D0, D1, D2 and D3 power states, and the ASPM mechanism enables PCIe devices to save power by entering low-power states such as L0s, L1, and clkreq in the power state D0. For example, when D0 state is activated, the ASPM mechanism allows PCIe links to enter L0s or L1 state.

When the ASPM function is enabled and the overall transmission data volume of the PCIe link is large, there will be a short period of idleness (in an order of microseconds) that allows the PCIe link to meet a condition for entering an ASPM mode. However, since the overall transmission data volume is large, the PCIe link will soon need to exit the ASPM mode and return to L0 state (fully functional link state). However, the time consumed in this exit process slows down the overall transmission efficiency, and since the PCIe link stays in the ASPM mode for only a short period of time, the power saving effect is limited.

In addition, under the circumstance that the PCIe link repeatedly enters and exits the ASPM mode, errors in the PCIe link may be caused for some PCIe devices with limited compatibility, such as to slow down the PCIe link, or even fail to detect the PCIe device. Under certain architectures, the ASPM function can be disabled by default to avoid compatibility issues; however, this will lead to increased power consumption.

SUMMARY OF THE DISCLOSURE

In response to the above-referenced technical inadequacies, the present disclosure provides a dynamic management method and a dynamic management system for an ASPM mechanism.

In one aspect, the present disclosure provides a dynamic management method for an ASPM mechanism, which is applicable to a PCIe transmission architecture that includes a host and a PCIe downstream component, in which the host includes a PCIe upstream component electrically connected to the PCIe downstream component through a PCIe interface, and the dynamic management method includes: configuring the PCIe downstream component to, in response to an ASPM function of the PCIe transmission architecture being enabled, perform the following steps: step S1: determining whether a data transmission status between the PCIe upstream component and the PCIe downstream component is in a busy state, a stable idle state or a temporary state; in response to determining that the data transmission status is in the busy state, performing step S2: forcibly disabling the ASPM function; in response to determining that the data transmission status is in the stable idle state, performing step S3: forcibly enabling the ASPM function; and in response to determining that the data transmission status is in the temporary state, performing step S1 again.

In another aspect, the present disclosure provides a dynamic management system for an ASPM mechanism, the dynamic management system includes a host and a PCIe downstream component. The host includes a PCIe upstream component, and the PCIe downstream component is electrically connected to the PCIe upstream component through a PCIe interface. In response to an ASPM function of the PCIe transmission architecture being enabled, the PCIe downstream component is configured to perform the following steps: step S1: determining whether a data transmission status between the PCIe upstream component and the PCIe downstream component is in a busy state, a stable idle state or a temporary state; in response to determining that the data transmission status is in the busy state, performing step S2: forcibly disabling the ASPM function; in response to determining that the data transmission status is in the stable idle state, performing step S3: forcibly enabling the ASPM function; and in response to determining that the data transmission status is in the temporary state, performing step S1 again.

Therefore, in the dynamic management method and dynamic management system for the ASPM mechanism provided by the present disclosure, it can be determined whether the transmission status of the PCIe device is in a busy state, an about-to-be-busy state, or a stable idle state, such that dynamical management can be achieved by forcing the ASPM mode to be enabled or disabled based on the data transmission status, so as to avoid frequent entering and exiting of the ASPM mode and ensure the overall transmission efficiency.

In addition, for some PCIe devices with limited compatibility, in the dynamic management method and dynamic management system for the ASPM mechanism provided by the present disclosure, issues such as errors caused in the PCIe link, slowing of the PCIe link, or failure in detecting the PCIe device can be addressed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 1:
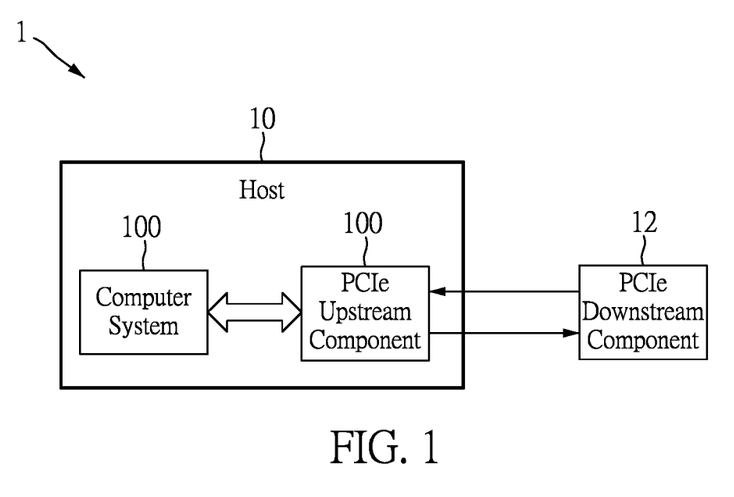
FIG. 1 is a first block diagram of a dynamic management system according to one embodiment of the present disclosure.

FIG. 1 is a first block diagram of a dynamic management system according to one embodiment of the present disclosure. Reference is made to FIG. 1, one embodiment of the present disclosure provides a dynamic management system 1 for an ASPM mechanism, the dynamic management system 1 is applicable for a PCIe transmission architecture and includes a host 10 and a PCIe downstream component 12. The host 10 can include a computer system 100 and a PCIe upstream component 102, and the PCIe downstream component 12 is electrically connected to the PCIe upstream component 102 through a PCIe interface. The host 10, the PCIe upstream component 102 and the PCIe downstream component 12 form the PCIe transmission architecture.

Figure 2:
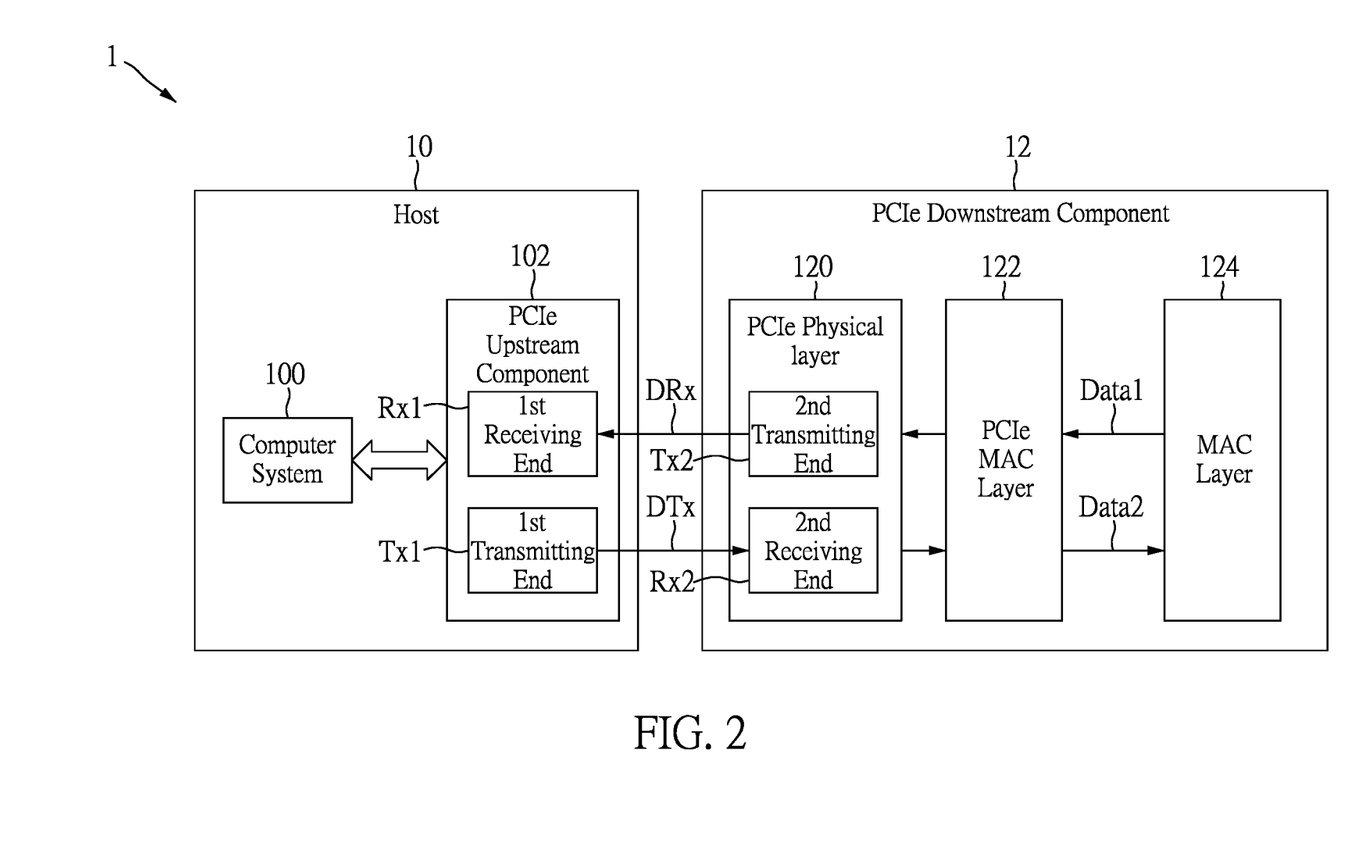
FIG. 2 is a second block diagram of a dynamic management system according to one embodiment of the present disclosure.

FIG. 2 is a second block diagram of a dynamic management system according to one embodiment of the present disclosure. As shown in FIG. 2, in some embodiments, the PCIe downstream component 12 can be, for example, a network interface card (NIC) connected to the host 10, and can include a PCIe physical layer 120, a PCIe media access layer (MAC) layer 122 and a MAC layer 124. The PCIe upstream component 102 includes a first receiving end Rx1 and a first transmitting end Tx1. The PCIe physical layer 120 is responsible for implementing the underlying protocol and generating signals, and can include a second transmitting end Tx2 and a second receiving end Rx2. The first receiving end Rx1 can receive a data signal DRx from the second transmitting end Tx2, and the first transmitting end Tx1 transmits a data signal DTx to the second receiving end Rx2.

The MAC layer 124 can be, for example, a data link layer between the physical layer and the network layer, and is mainly used to establish a logical connection between networks, and handle flow control and error detection during transmission, so as to allow data transmission and reception to be more stable. The data link layer encapsulates digital signals of the physical layer into a set of logical transmission data (such as Data1 and Data2). This set of signals is called a data frame, and the data frame contains a MAC address to allow network devices to identify each other when communicating on a local area network. It should be noted that the example shown in FIG. 2 above is merely one possible embodiment, and is not intended to limit the present disclosure.

Figure 3:
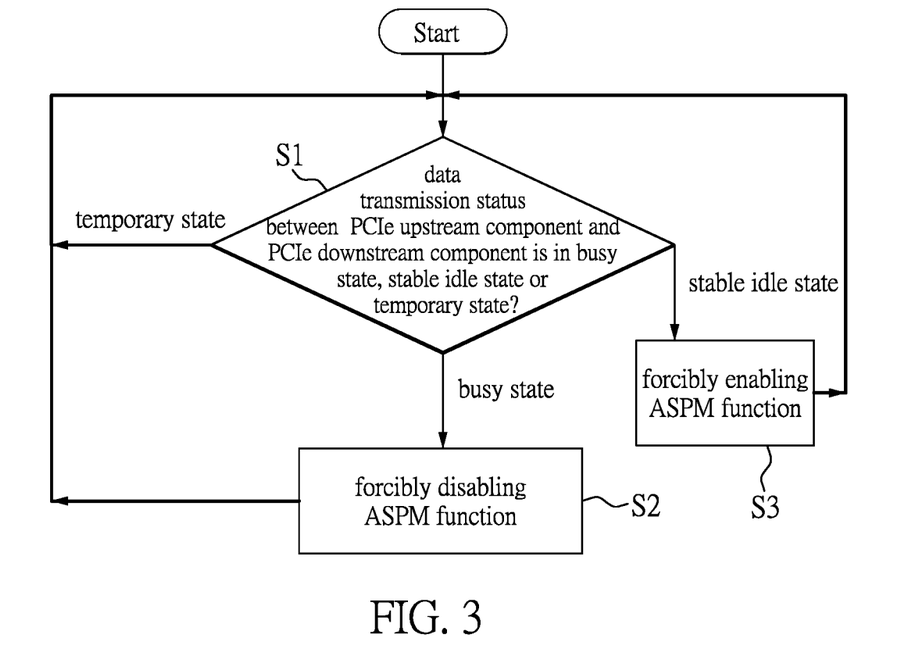
FIG. 3 is a first flowchart of a dynamic management method according to one embodiment of the present disclosure.

FIG. 3 is a first flowchart of a dynamic management method according to one embodiment of the present disclosure. Reference is made to FIG. 3, one embodiment of the present disclosure provides a dynamic management method for an ASPM mechanism, which is applicable to the dynamic management system 1 and the PCIe transmission architecture thereof provided in FIGS. 1 and 2.

It should be noted that PCIe can operate in four power states, including power states such as D0, D1, D2, and D3 states. The PCIe standard regulates the ASPM mechanism. The ASPM mechanism enables PCIe devices to enter low-power link states such as L0s, L1 and CLKREQ states to save power under the D0 state. The L0 state represents a fully active mode that consumes the most power, and the L0s state represents that a PCIe link enters a power saving mode in a single direction, such as an upstream direction or a downstream direction. In addition, the L1 state means that the PCIe link enters the power-saving mode in the upstream or downstream direction, and the L1 state is another power-saving mode that saves more power than the L0s state. However, it costs longer delay time for the PCIe link to return from the L1 state and enter the L0 state (link active state). The CLKREQ state is yet another power-saving mode that can save more power after entering the L1 state.

In general, after the computer system 100 normally starts a basic input/output system (BIOS) and an operating system driver that correspond to the PCIe transmission architecture, the ASPM function can be enabled by controlling a PCIe register through the BIOS or other software, this allows the PCIe link to be switched between link states such as the CLKREQ, L1, L0s, and L0 states according to the PCIe standard, which is hereinafter referred to as a non-dynamic ASPM mode.

Therefore, in the dynamic management method of the present disclosure, after the PCIe downstream component 12 determines that the computer system 100 normally starts the BIOS and the operating system driver program that correspond to the PCIe transmission architecture, and after determining that the ASPM function of the PCIe transmission architecture is enabled, the PCIe downstream component 12 is configured to perform the following steps:

Step S1: determining whether a data transmission status between the PCIe upstream component and the PCIe downstream component is in a busy state, a stable idle state or a temporary state.

In response to determining that the data transmission status is in the busy state, the dynamic management method proceeds to step S2: forcibly disabling the ASPM function.

In response to determining that the data transmission status is in the stable idle state in the step S1, the dynamic management method proceeds to step S3: forcibly enabling the ASPM function.

In response to determining that the data transmission status is in the temporary state in the step S1, the dynamic management method performs step S1 again. However, after the step S2 or S3 is executed, the step S1 can still be executed repeatedly to continuously monitor the data transmission status, so as to achieve a dynamic management mechanism.

It should be noted that the above-mentioned process in FIG. 3 is merely a basic description for the dynamic management method of the present disclosure, and a core concept thereof is to perform the dynamic management by forcibly enabling or disabling the ASPM function according to the transmission status of the PCIe device (that is, the PCIe downstream component 12). When the ASPM function is forcibly disabled, the PCIe downstream component 12 can control the PCIe transmission architecture to not enter or exit the ASPM mode, and at the same time force the PCIe link to return to the L0 state to ensure transmission efficiency.

On the other hand, when the ASPM function is forcibly enabled, the PCIe downstream component 12 can control the PCIe transmission architecture to enter and exit the ASPM mode according to the PCIe standard specification, that is, to allow the PCIe link to be switched between the CLKREQ, L1, L0s, L0 states according to the PCIe standard. Furthermore, the so-called temporary state can be, for example, an about-to-be-busy state or an about-to-be-idle state, which will be further described in subsequent embodiments.

Figure 4:
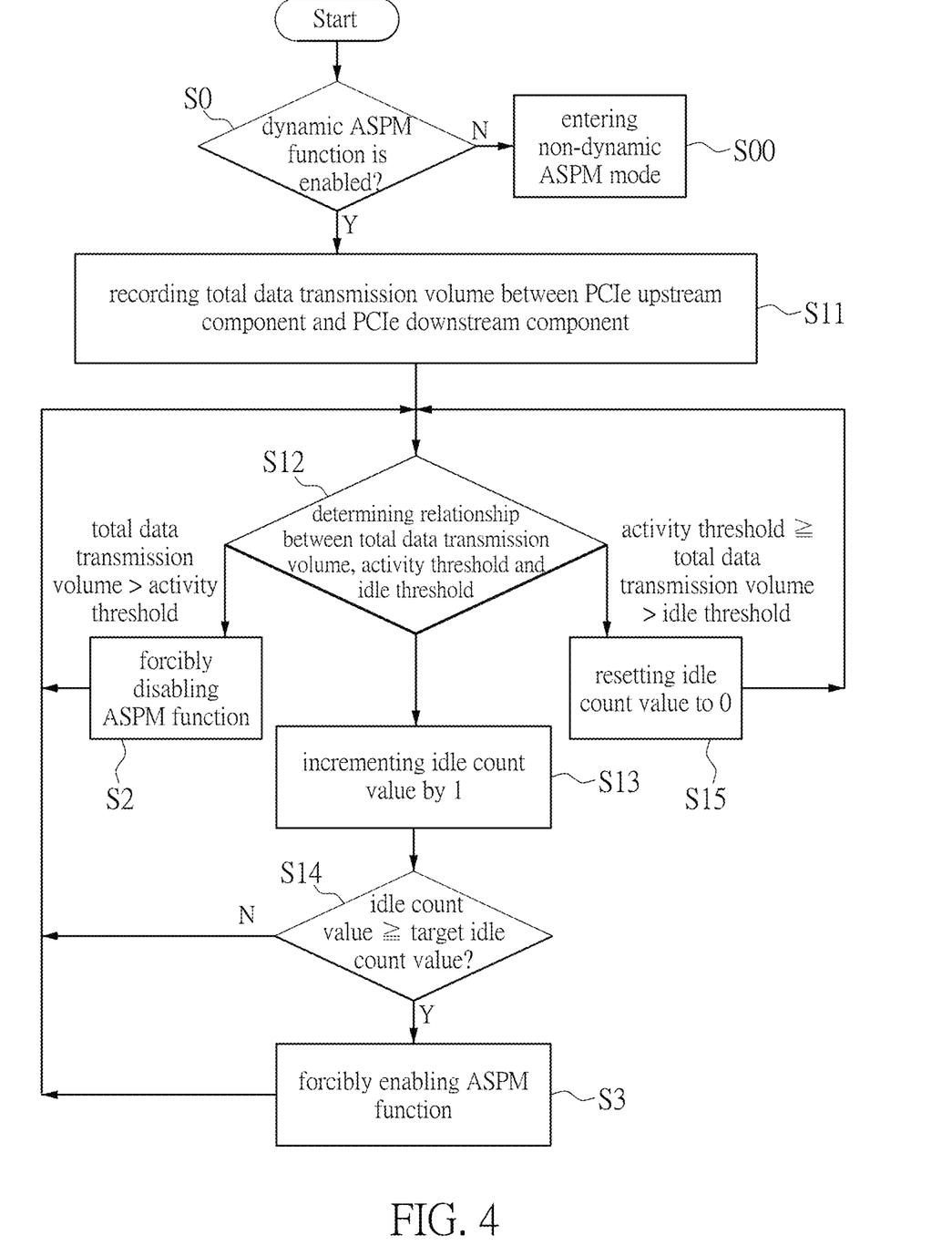
FIG. 4 is a second flowchart of the dynamic management method according to one embodiment of the present disclosure.

Reference is further made to FIG. 4, which is a second flowchart of the dynamic management method according to one embodiment of the present disclosure. The details of each step will be described in detail below based on FIG. 3.

Referring to FIG. 4, in one specific embodiment, the dynamic management method can include the following steps:

Step S0: determining whether a dynamic ASPM function is enabled. In detail, this step can be used to provide a user to configure whether or not the host 100 executes the dynamic management mechanism provided by the present disclosure for the PCIe transmission architecture.

In response to determining that the dynamic ASPM function is enabled, the dynamic management method proceeds to step S11.

In response to determining that the dynamic ASPM function is disabled, the dynamic management method proceeds to step S00: entering a non-dynamic ASPM mode. It should be noted that this step is to allow the PCIe link to be switched between the CLKREQ, L1, L0s, and L0 states according to the PCIe standard.

Step S11: recording a total data transmission volume between the PCIe upstream component and the PCIe downstream component. In more detail, the total data transmission volume includes a data transmission volume of data (for example, the data signal DTx) transmitted from the PCIe upstream component 102 to the PCIe downstream component 12 and data reception volume of data received by the PCIe upstream component 102 from the PCIe downstream component 12 (for example, the data signal DTx), and is recorded based on a predetermined period (for example, 1 second or one cycle of a system clock signal). That is, the data transmission volume in each predetermined period is recorded as the total data transmission volume.

Step S12: determining a relationship between the total data transmission volume, an activity threshold and an idle threshold. In detail, in this step, the relationship between the total data transmission volume in one of the predetermined periods, the activity threshold and the idle threshold can be determined. The activity threshold and the idle threshold are used to set a range to determine whether the total data transmission volume is in the busy state, the about-to-be-busy state, the about-to-be-idle state, or the stable idle state, and the active threshold must be greater than the idle threshold.

In response to determining that the total data transmission volume is greater than the activity threshold, the data transmission status is determined to be in the busy state, and the dynamic management method proceeds to the step S2: forcibly disabling the ASPM function. Similar to the foregoing embodiments, when the ASPM function is forcibly disabled, the PCIe downstream component 12 can control the PCIe transmission architecture to not enter or exit the ASPM mode, and at the same time force the PCIe link to return to the L0 state to ensure transmission efficiency. For example, when the predetermined period is set to 1 second, and the activity threshold is set to 10 data transmission units, if the total data transmission volume between the PCIe upstream component 102 and the PCIe downstream component 10 within 1 second is greater than 10 data transmission units, it means that the PCIe link is about to start transmitting data frequently, and the PCIe link will soon be busy. Therefore, the PCIe downstream component 10 will immediately forcibly disable the ASPM function, and immediately make the PCIe link return to the L0 state, so as to ensure the transmission efficiency.

It should be noted that, only determining the total data transmission volume in one predetermined period may not be enough to distinguish whether it is about to enter the idle state or the stable idle state. Therefore, in this embodiment, a continuous period of time or consecutive times of entering the idle state is further determined, thereby determining whether or not to enter the stable idle state.

Therefore, in response to determining that the total data transmission volume is less than the idle threshold, the dynamic management method proceeds to step S13: incrementing an idle count value by 1. The idle count value can be used to record the continuous period of time or the consecutive times of entering the idle state.

After step S13 is executed, the dynamic management method proceeds to step S14: determining whether or not the idle count value is greater than or equal to a target idle count value.

In response to determining the idle count value to be less than the target idle count value in step S14, which means that the data transmission status is just entering the idle state and has not yet reached a condition of stable idle, the dynamic management method again performs the step S12 for real-time monitoring and determination of the total data transmission volume, so as to achieve the dynamic management mechanism.

In response to determining that the idle count value is greater than or equal to the target idle count value in the step S14, it means that the data transmission status has reached the condition of the stable idle state, and the dynamic management method proceeds to the step S3: forcibly enabling the ASPM function. Similar to the foregoing embodiments, when the ASPM function is forcibly enabled, the PCIe downstream component 12 can control the PCIe transmission architecture to enter and exit the ASPM mode according to the PCIe standard specification.

For example, if the predetermined period is set to 1 second, the idle threshold value is set to 4 data transmission units, and the target idle count value is set to 6, if the total data transmission volume within 1 second is less than 4 data transmission units, the idle count value is incremented by 1, if the total data transmission volume transmitted in 5 consecutive periods (5 consecutive seconds) is less than 4 data transmission units, the idle threshold value is 5, then it is determined that the PCIe link is currently in the stable idle state. At the 6th second, the PCIe downstream component 12 forcibly enables the ASPM function, this controls the PCIe transmission architecture to enter and exit the ASPM mode according to the PCIe standard specification, so as to reduce power consumptions.

On the other hand, if it is determined in step S12 that the total data transmission volume is less than or equal to the activity threshold and greater than the idle threshold, it means that the data transmission status is in the about-to-be-busy state, which is equivalent to an interruption of the aforementioned idle state. At this time, the dynamic management method proceeds to step S15: resetting the idle count value to 0. This step is to reset the mechanism for recording the idle state, and the way of setting the idle count value is merely an example, and the present disclosure is not limited thereto.

For example, the predetermined period is set to 1 second, the idle threshold value is set to 4 data transmission units, and the target idle count value is set to 6. If there is a total data transmission volume transferred within 1 second greater than 4 data transmission units before the idle count value reaches 6, it is determined that the PCIe link is about to enter the busy state, and the idle count value is cleared, and since the idle count value needs to be counted from 0, the ASPM mode will not be forcibly enabled until the condition of the stable idle state is reached.

After step S15 is performed, the dynamic management method can perform step S12 again to monitor the total data transmission volume, thereby realizing the dynamic management mechanism.

Beneficial Effects of the Embodiments

In conclusion, in the dynamic management method and dynamic management system for the ASPM mechanism provided by the present disclosure, it can be determined whether the transmission status of the PCIe device is in a busy state, an about-to-be-busy state, or a stable idle state, such that dynamical management can be achieved by forcing the ASPM mode to be enabled or disabled based on the data transmission status, so as to avoid frequent entering and exiting of the ASPM mode and ensure the overall transmission efficiency.

In addition, for some PCIe devices with limited compatibility, in the dynamic management method and dynamic management system for the ASPM mechanism provided by the present disclosure, issues such as errors caused in the PCIe link, slowing of the PCIe link, or failure in detecting the PCIe device can be addressed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dynamic management method for active state power management (ASPM) mechanism, adapted to a peripheral component interconnect express (PCIe) transmission architecture that includes a host and a PCIe downstream component, in which the host includes a PCIe upstream component electrically connected to the PCIe downstream component through a PCIe interface, in which the host is configured to execute a dynamic management method, and the dynamic management method comprising:
  step S1: determining whether a data transmission status between the PCIe upstream component and the PCIe downstream component is in a busy state, a stable idle state or a temporary state;
  wherein the step S1 further includes:
  step S11: recording a total data transmission volume between the PCIe upstream component and the PCIe downstream component;
  wherein the total data transmission volume includes a data transmission volume of data transmitted by the PCIe upstream component to the PCIe downstream component and a data reception volume of data received by the PCIe upstream component from the PCIe downstream component;
  step S12: determining a relationship between the total data transmission volume, an activity threshold and an idle threshold, wherein the activity threshold is greater than the idle threshold;
  in response to determining that the total data transmission volume is greater than the activity threshold, determining that the data transmission status is in the busy state;
  in response to determining that the total data transmission status is in the busy state, performing step S2: forcibly disabling an ASPM function;
  in response to determining that the total data transmission volume is less than the idle threshold, performing step S13: incrementing an idle count value by 1;
  in response to the step S13 being performed, performing step S14: determining whether the idle count value is greater than or equal to a target idle count value;
  in response to determining that the idle count value is greater than or equal to the target idle count value, determining that the data transmission state is in the stable idle state;
  in response to determining that the data transmission status is in the stable idle state, performing step S3; forcibly enabling the ASPM function;
  in response to determining that the idle count value is less than the target idle count value, performing the step S12 again; and
  in response to determining that the total data transmission volume is less than or equal to the activity threshold and greater than the idle threshold, performing step S15: resetting the idle count value to 0, determining that the data transmission status is in an about-to-be-busy state, and performing the step S12 again;
  in response to determining that the data transmission status is in the temporary state, performing step S1 again.

2. The dynamic management method according to claim 1, further comprising: performing step S0:
   determining whether a dynamic management method is executed;
   in response to determining that the dynamic management method is executed, performing step S1;
   in response to determining that the dynamic management method is not executed, executing a non-dynamic ASPM mode.

3. The dynamic management method according to claim 1, wherein the step S11 further includes: recording data transmission volume in each predetermined period as the total data transmission volume that is recorded, and in the step S12, the relationship between the total data transmission volume, the activity threshold and the idle threshold is determined within the predetermined period.

4. The dynamic management method according to claim 1, wherein the host includes a computer system, and the dynamic management method further comprises: performing the step S1 in response to the PCIe downstream component determining that the computer system normally starts a basic input/output system (BIOS) and an operating system driver that correspond to the PCIe transmission architecture.

5. The dynamic management method according to claim 4, wherein, in response to the ASPM function being forcibly disabled, the computer system controls the PCIe transmission framework to not enter or exit an ASPM mode;
   wherein, in response to the ASPM function being forcibly enabled, the computer system controls the PCIe transmission framework to enter and exit the ASPM mode according to a PCIe standard specification.

6. The dynamic management method according to claim 1, wherein the total data transmission volume is obtained by recording the data transmission volume of the data transmitted by the PCIe upstream component to the PCIe downstream component and the data reception volume of the data received by the PCIe upstream component from the PCIe downstream component in each predetermined period.

7. A dynamic management system for an ASPM mechanism, the dynamic management system comprising:
   a PCIe transmission architecture, including:
   a host including a PCIe upstream component; and
   a PCIe downstream component electrically connected to the PCIe upstream component through a PCIe interface,
   wherein, the host is configured to execute a dynamic management method including:
   step S1: determining whether a data transmission status between the PCIe upstream component and the PCIe downstream component is in a busy state, a stable idle state or a temporary state;
   wherein the step S1 further includes:
   step S11: recording a total data transmission volume between the PCIe upstream component and the PCIe downstream component;
   wherein the total data transmission volume includes a data transmission volume of data transmitted by the PCIe upstream component to the PCIe downstream component and a data reception volume of data received by the PCIe upstream component from the PCIe downstream component;
   step S12: determining a relationship between the total data transmission volume, an activity threshold and an idle threshold, wherein the activity threshold is greater than the idle threshold;
   in response to determining that the total data transmission volume is greater than the activity threshold, then determining that the data transmission status is in the busy state;
   in response to determining that the data transmission status is in the busy state, performing step S2: forcibly disabling the ASPM function;
   in response to determining that the total data transmission volume is less than the idle threshold, performing step S13: incrementing an idle count value by 1;
   in response to the step S13 being performed, performing step S14: determining whether the idle count value is greater than or equal to a target idle count value;
   in response to determining that the idle count value is greater than or equal to the target idle count value, determining that the data transmission state is in the stable idle state;
   in response to determining that the data transmission status is in the stable idle state, performing the step S3: forcibly enabling the ASPM function;
   in response to determining that the idle count value is less than the target idle count value, performing the step S12 again; and
   in response to determining that the total data transmission volume is less than or equal to the activity threshold and greater than the idle threshold, performing step S15: resetting the idle count value to 0, determining that the data transmission status is in an about-to-be-busy state, and performing the step S12 again;
   in response to determining that the data transmission status is in the temporary state, performing step S1 again.

8. The dynamic management system according to claim 7, wherein the PCIe downstream component is further configured to perform step S0:
   determining whether a dynamic management method is executed;
   in response to determining that the dynamic management method is enabled, performing step S1;
   in response to determining that the dynamic management method is not executed, executing a non-dynamic ASPM mode.

9. The dynamic management system according to claim 7, wherein the step S11 further includes: recording data transmission volume in each predetermined period as the total data transmission volume that is recorded, and in the step S12, the relationship between the total data transmission volume, the activity threshold and the idle threshold is determined within the predetermined period.

10. The dynamic management system according to claim 7, wherein the host includes a computer system, and the step S1 is performed in response to the PCIe downstream component determining that the computer system normally starts a basic input/output system (BIOS) and an operating system driver that correspond to the PCIe transmission architecture.

11. The dynamic management system according to claim 10, wherein, in response to the ASPM function being forcibly disabled, the computer system is configured to control the PCIe transmission architecture to not enter or exit an ASPM mode;
   wherein, in response to the ASPM function being forcibly enabled, the computer system controls the PCIe transmission framework to enter and exit the ASPM mode according to a PCIe standard specification.

12. The dynamic management system according to claim 7, wherein the total data transmission volume is obtained by recording the data transmission volume of the data transmitted by the PCIe upstream component to the PCIe downstream component and the data reception volume of the data received by the PCIe upstream component from the PCIe downstream component in each predetermined period.

* * * * *